US008002314B2

(12) United States Patent
Meyzaud et al.

(10) Patent No.: US 8,002,314 B2
(45) Date of Patent: Aug. 23, 2011

(54) T-SHAPED PIPEFITTING ELEMENT PERTAINING TO AN AUXILIARY CIRCUIT OF A NUCLEAR REACTOR, CONNECTION PIECE

(75) Inventors: Yves Meyzaud, St Jouin de Blavou (FR); Jean Alain Le Duff, Poissy (FR)

(73) Assignee: Areva NP, Courbevoie (FR)

( * ) Notice: Subject to any disclaimer, the term of this patent is extended or adjusted under 35 U.S.C. 154(b) by 167 days.

(21) Appl. No.: 11/577,249

(22) PCT Filed: Sep. 26, 2005

(86) PCT No.: PCT/FR2005/002380
§ 371 (c)(1),
(2), (4) Date: Apr. 13, 2007

(87) PCT Pub. No.: WO2006/042924
PCT Pub. Date: Apr. 27, 2006

(65) Prior Publication Data
US 2007/0248203 A1    Oct. 25, 2007

(30) Foreign Application Priority Data
Oct. 15, 2004    (FR) ...................................... 04 10971

(51) Int. Cl.
*F16L 41/02*    (2006.01)
*F16L 41/00*    (2006.01)
(52) U.S. Cl. .................. 285/133.11; 285/288.1; 285/329
(58) Field of Classification Search ............. 285/133.11, 285/133.21, 133.3, 133.4, 133.5, 133.6, 288.1, 285/329
See application file for complete search history.

(56) References Cited

U.S. PATENT DOCUMENTS

| 921,111 A | * | 5/1909 | Honeywell | ....................... 138/37 |
| 1,678,783 A | * | 7/1928 | Oakley | ..................... 137/247.27 |
| 2,034,553 A | * | 3/1936 | Askin | ........................... 165/154 |

(Continued)

FOREIGN PATENT DOCUMENTS

DE    32 18 337 A1    12/1983

(Continued)

OTHER PUBLICATIONS

"Cast Stainless Steels", www.products.asminternational.org/hbk/do/highlight/content/V01/D06/A07/S0002974.html, pp. 1-16.*

Primary Examiner — James M Hewitt
(74) Attorney, Agent, or Firm — Connolly Bove Lodge & Hutz LLP

(57) ABSTRACT

A T-shaped pipe fitting element comprises a main tubular branch having first and second ends for connection to first and second pipe fitting sections of an auxiliary circuit, respectively, and a lateral branch having an axis which is at an angle to the axis of the main branch, and a free end for connecting to a third pipe fitting section of the auxiliary circuit. The first, second, and third pipe fitting sections each have different functions. One supplies the pipe fitting element with a first fluid at a high temperature, another supplies a second fluid to the pipe fitting element, at a lower temperature than the first fluid, and the third discharges a mixture of the first and second fluids. The pipe fitting sections consist of austenitic stainless steel. The T-shaped pipe fitting consists of stainless martensitic steel with improved thermal endurance properties.

4 Claims, 3 Drawing Sheets

U.S. PATENT DOCUMENTS

Figure 1:
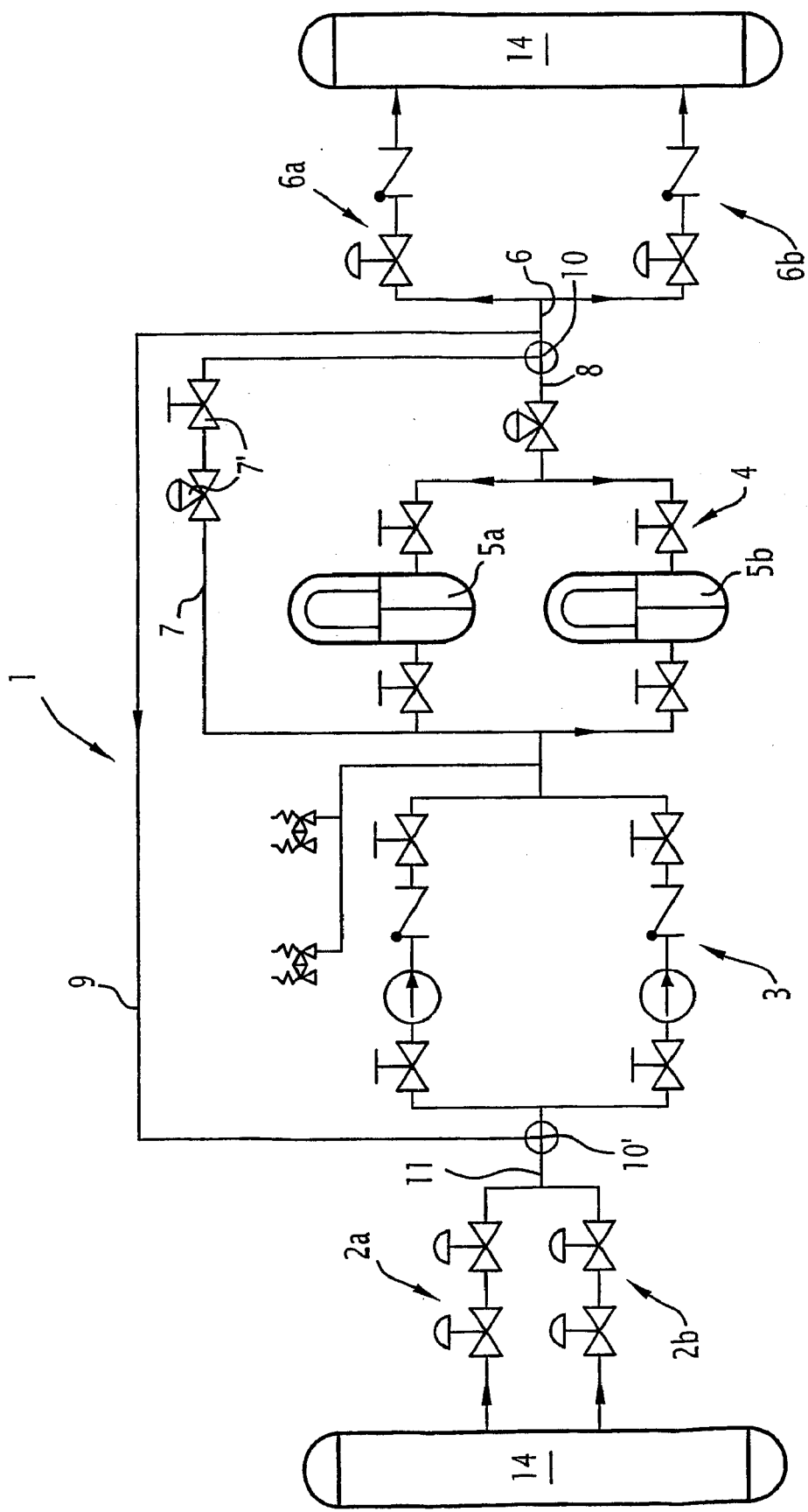

| | | | | |
|---|---|---|---|---|
| 2,050,728 | A | * | 8/1936 | Ost ................................ 285/289.5 |
| 2,091,982 | A | * | 9/1937 | Hart ................................... 219/107 |
| 2,149,844 | A | * | 3/1939 | George ............................ 403/178 |
| 2,157,274 | A | * | 5/1939 | Williams ..................... 285/133.11 |
| 2,281,781 | A | * | 5/1942 | Merrill et al. ................... 137/318 |
| 2,611,238 | A | * | 9/1952 | Fryer, Jr. ............................ 60/322 |
| 2,799,519 | A | * | 7/1957 | Winson ........................ 285/133.11 |
| 3,392,994 | A | * | 7/1968 | Moore .......................... 285/133.11 |
| 3,700,851 | A | * | 10/1972 | Bjorkroth ..................... 219/137 R |
| 4,374,680 | A | * | 2/1983 | Azbukin et al. .................. 148/542 |
| 4,708,372 | A | * | 11/1987 | Arima et al. .................. 285/130.1 |
| 5,105,843 | A | * | 4/1992 | Condron et al. .................. 137/13 |
| 5,303,504 | A | * | 4/1994 | Buzzell ................................ 47/52 |
| 5,975,590 | A | * | 11/1999 | Cowan et al. ............... 285/133.11 |
| 6,264,833 | B1 | * | 7/2001 | Reamsnyder et al. ........... 210/133 |
| 6,520,432 | B2 | * | 2/2003 | Molnar .......................... 239/585.1 |
| 6,568,713 | B1 | * | 5/2003 | Bruvry et al. ............... 285/133.21 |
| 2003/0127852 | A1 | * | 7/2003 | Usui ............................... 285/125.1 |
| 2003/0230557 | A1 | * | 12/2003 | Briand et al. ................ 219/121.64 |
| 2007/0221144 | A1 | * | 9/2007 | Becker et al. ..................... 122/511 |

FOREIGN PATENT DOCUMENTS

| | | |
|---|---|---|
| DE | 195 27 634 A1 | 1/1997 |
| JP | 05 333177 A | 12/1993 |
| JP | 10 273733 A | 10/1998 |
| JP | 2000 234144 A | 8/2000 |

* cited by examiner

T-SHAPED PIPEFITTING ELEMENT PERTAINING TO AN AUXILIARY CIRCUIT OF A NUCLEAR REACTOR, CONNECTION PIECE

This application is the National Stage of International Application No. PCT/FR2005/002380 filed on Sep. 26, 2005; and this application claims priority of Application No. 0410971 filed in France on Oct. 15, 2004 under 35 U.S.C. §119; the entire contents of all are hereby incorporated by reference.

The invention relates to a T-shaped pipework element for an auxiliary circuit of a nuclear reactor cooled by pressurised water, a connection piece comprising the T-shaped pipework element and a method for assembling or replacing the T-shaped pipework element in an auxiliary circuit of a nuclear reactor.

Nuclear reactors which are cooled by pressurised water comprise a main circuit, or coolant system, in which the pressurised cooling water of the nuclear reactor flows and auxiliary circuits which are connected to the coolant system in order to carry out different functions, during the operation of the nuclear reactor or when the reactor is shut down.

In particular, nuclear reactors which are cooled by pressurised water comprise an auxiliary cooling circuit, referred to as a residual heat removal system, which is used to carry out the cooling and the depressurisation of the cooling water in the coolant system of the nuclear reactor, following a programmed shutdown of the reactor, for example, in order to recharge with fuel assemblies or a shutdown which has been brought about by an operational incident.

Firstly, the water of the coolant system is cooled from the operating temperature in the reactor during operation (in the order of 315° C.) and depressurised, by passing through the vapour generators from which vapour is discharged. The water of the coolant system is generally cooled to a temperature in the order of 180° C. and depressurised to a pressure lower than 30 bar.

The subsequent cooling of the coolant water to the cooling conditions at shutdown is carried out in the residual heat removal system which comprises in particular pumps and heat exchangers which are supplied with cooling water for the reactor at a primary side and at the secondary side with coolant water.

The water of the coolant system is taken, generally from two hot branches of two loops of the coolant system, to be cooled and depressurised in the residual heat removal system before being reintroduced into two cold branches of loops of the coolant system.

Coolant water which has not yet been cooled is generally mixed with cooled water in the heat exchangers. A portion of the water obtained by mixing is also reintroduced into the high-temperature coolant water which is from the hot branches of loops of the coolant system, upstream of the heat exchangers of the residual heat removal system. It is also possible to mix water obtained by means of mixing with cooled water.

For example, the mixture of high-temperature coolant water which constitutes a first fluid flowing in the auxiliary circuit and cooled water which constitutes a second fluid flowing in the auxiliary circuit can be carried out inside T-shaped pipework connections which comprise, on the one hand, a main branch which is interposed between two portions of a first pipe of the auxiliary circuit in which the coolant water at high temperature flows constituting a first exchange fluid and, on the other hand, a lateral branch which is generally perpendicular relative to the main branch which is connected to a second pipe of the auxiliary circuit which receives cooled water. The cooled water, owing to an imprecise mixture with the coolant water to be cooled and variations in the mixing conditions, produces variations of temperature at a relatively high frequency which bring about thermal fatigue of the material which constitutes the T-shaped pipework element for connecting and mixing. A fracture of thermal origin may result on the inner surface and even all of the wall of the T-shaped tubular connection owing to phenomena such as thermal cracking. The effect of the stresses brought about in the internal wall of the pipework element is even more pronounced since the T-shaped connection member must be connected to the duct by means of weld seams which make the inner wall more susceptible to occurrences of damage owing to concentration of thermal deformations or corrosion.

The ducts of the auxiliary circuits of pressurised water nuclear reactors and in particular the pipes which constitute the residual heat removal system are generally produced from austenitic stainless steel and the T-shaped pipework elements for connecting and mixing are also of austenitic stainless steel and are connected to the pipes of the auxiliary circuit by means of weld seams.

It has been found that, when austenitic stainless steels of this type are used in auxiliary circuits of a nuclear reactor which is cooled by pressurised water, it is necessary to take various measures to limit the occurrences of damage in the region of the T-shaped connecting and mixing elements under the effect of stresses. The connecting weld seams of the T-shaped member are, for example, levelled and the critical zones of the inner surface of the connection element are polished in order to prevent the development of fractures. Furthermore, periodic control must be carried out in order to allow the efficiency of the measures taken to be verified.

It has also been envisaged to use internal protection devices for the wall of the pipework elements in the region of the T-shaped connection, comprising a tubular protection wall which is fixed in a coaxial device inside the main branch of the T-shaped member. A protection wall of this type which acts as a thermal sleeve, in accordance with a well known technique used within the nuclear industry, must be perforated by holes so that coolant water at high temperature and cooled water can be mixed in the region of the T-shaped pipework element, at least in all of the portion of the protection wall located in the zone where the lateral branch opens in the main branch of the T-shaped member. The through-holes must be appropriately sized in order to allow the creation of a large number of jets of cold water in the channel of hot coolant water flowing in the main branch, which facilitates the mixture of the cooling water at high temperature which constitutes the first fluid and the water at lower temperature which constitutes the second fluid, inside the tubular protection wall.

Furthermore, the use of a perforated tubular protection wall has two major disadvantages.

First of all, the flow rates of water at high temperature and cooled water may vary very widely during the operation of the residual heat removal system. The same applies to the pressure of the fluids in the region of the T-shaped connecting and mixing element. Under these substantially variable operating conditions, the T-shaped connection member comprising a tubular protection and mixing wall may be completely ineffective during some operating phases.

Furthermore, pressure drops owing to the passage of the cooled water through the holes of the tubular protection wall are very high when the flow rate of cooled water is at a maximum. These pressure drops very substantially reduce the efficiency levels of the residual heat removal system. Operation of this type with reduced levels of efficiency is unacceptable in so far as the flow rate of cooled water introduced into the main branch of the T-shaped mixing and connecting member determines the time taken for cold shut-down of the nuclear reactor.

In order to overcome these disadvantages, FR 03 14640 proposed a mixing device comprising a protection wall which has a high level of openness and fluid mixing elements which are arranged inside the protection wall.

A device of this type has a more complex construction than a simple T-shaped tubular pipework element. Furthermore, this solution presents the risk of creating migrant bodies in the main circuit.

Generally, in the case of auxiliary circuits of pressurised water nuclear reactors, it is desirable to have T-shaped connecting and mixing members which can have a high level of resistance, in particular in terms of thermal fatigue, when they mix a first fluid arriving in the T-shaped pipework element via a first end of a first branch and a second fluid arriving in the T-shaped pipework element via a second branch which has a significant temperature difference compared with the first fluid, for example, 50° C.

In the construction of pressurised water nuclear reactors, martensitic stainless steels were used, for example, of the type Z5CND13-4, Z12C13 or Z12CN13 in order to produce, by means of forging, parts or components of the mechanisms for moving the rods for controlling the reactivity of the core of the reactor. However, martensitic stainless steels of this type were never envisaged for the production of pipework elements which are intended to be fixed by means of welding to austenitic stainless steel pipes of an auxiliary circuit of the nuclear reactor.

The object of the invention is therefore to provide, for an auxiliary circuit of a nuclear reactor which is cooled by pressurised water, a T-shaped pipework element which is connected to a coolant system of the nuclear reactor in which cooling water of the reactor flows, comprising a main tubular branch which has a first end, for the connection thereof to a first pipework portion of the auxiliary circuit, and a second end, for the connection thereof to a second pipework portion of the auxiliary circuit and a lateral branch which has an axis in an angular arrangement relative to the axis of the main branch and a free end for connection to a third pipework portion of the auxiliary circuit, so that the first, the second and the third pipework portions of the auxiliary circuit, when the auxiliary circuit is operational, each carry out a function different from the other two portions, including supplying a first fluid at high temperature in the T-shaped pipework element, providing a second fluid at a temperature which is lower than the temperature of the first fluid for the pipework element, and discharging a mixture of the first and second fluids produced in the T-shaped pipework element, this pipework element having a high level of resistance to thermal fatigue, without it being necessary to provide a protection sleeve.

To this end, the pipework element according to the invention is produced from martensitic stainless steel.

According to more specific features which will be taken in isolation or in combination:

the martensitic stainless steel contains (in percentages by weight) up to 0.060% of carbon, from 12% to 14% of chromium, from 3.50% to 4.50% of nickel, from 0.30% to 0.70% of molybdenum, from 0.50% to 1% of manganese, from 0.30% to 0.60% of silicon, less than 0.020% of sulphur, less than 0.030% of phosphorus, the remainder of the composition, with the exception of any impurities, being constituted by iron, the martensitic stainless steel contains (in percentages by weight) up to 0.050% of carbon, from 12.50% to 14% of chromium, from 3.50% to 4.50% of nickel, from 0.50% to 0.70% of molybdenum, from 0.50% to 1.00% of manganese, from 0.30% to 0.60% of silicon, less than 0.005% of sulphur and less than 0.005% of phosphorus, the remainder of the alloy, with the exception of the inevitable impurities, being constituted by iron, the pipework element is produced by means of forging with a global forging coefficient greater than 3 followed by a thermal processing operation comprising oil quenching from a temperature of from 950° C. to 1080° C. and a tempering operation at a temperature greater than 580° C., the pipework element is produced in an asymmetrical T-shape, the lateral branch being connected to the main branch in a zone of the main branch which is not equidistant from the first and the second ends of the main branch.

The invention also relates to:

an austenitic stainless steel connection piece for an auxiliary circuit of a pressurised water nuclear reactor having a T-shaped pipework element comprising the martensitic stainless steel T-shaped tubular element and, connected end-to end to the first and second ends of the main branch and to the free end of the lateral branch, respectively, austenitic stainless steel tubular connection elements which are each butt-welded to a respective end of the main branch or the lateral branch of the T-shaped tubular element, a method for producing and assembling a T-shaped pipework element of an auxiliary circuit of a nuclear reactor cooled by pressurised water, wherein:

a T-shaped pipework element is produced from martensitic stainless steel by means of forging or stamping;

the forged pipework element is thermally processed by means of oil quenching from a temperature of between 950° C. and 1080° C., followed by a tempering operation at a temperature greater than 580° C.;

tubular connection elements of austenitic stainless steel are fixed, by means of butt-welding, to the first and second ends of the main branch and to the free end of the lateral branch of the pipework element;

the T-shaped pipework element is fixed, by means of welding, to the austenitic stainless steel pipes of the auxiliary circuit of the pressurised water nuclear reactor, by butt-welding the connection elements to free end portions of the austenitic stainless steel pipes of the auxiliary circuit.

Preferably:

the butt-welding of each of the austenitic stainless steel tubular connection elements is carried out on the corresponding end portion of the T-shaped pipework element of martensitic stainless steel using one of the following methods:

producing a bi-metal connection of austenitic stainless steel by depositing a buttering of austenitic stainless steel on the end of the T-shaped tubular element of martensitic stainless steel and filling a chamfer gap between the buttering of austenitic stainless steel and the corresponding connection element using a filler metal of austenitic stainless steel;

producing a bi-metal connection of a nickel-based alloy by depositing a filler metal of a nickel-based alloy in a narrow chamfer gap between the end of the T-shaped pipework element of martensitic stainless steel and the corresponding tubular connection element of austenitic stainless steel;

producing a bi-metal connection of martensitic stainless steel by depositing a filler metal of martensitic stainless steel in a chamfer gap between the connection end of the T-shaped pipework element of martensitic stainless steel and the connection element of austenitic stainless steel.

Figure 2:
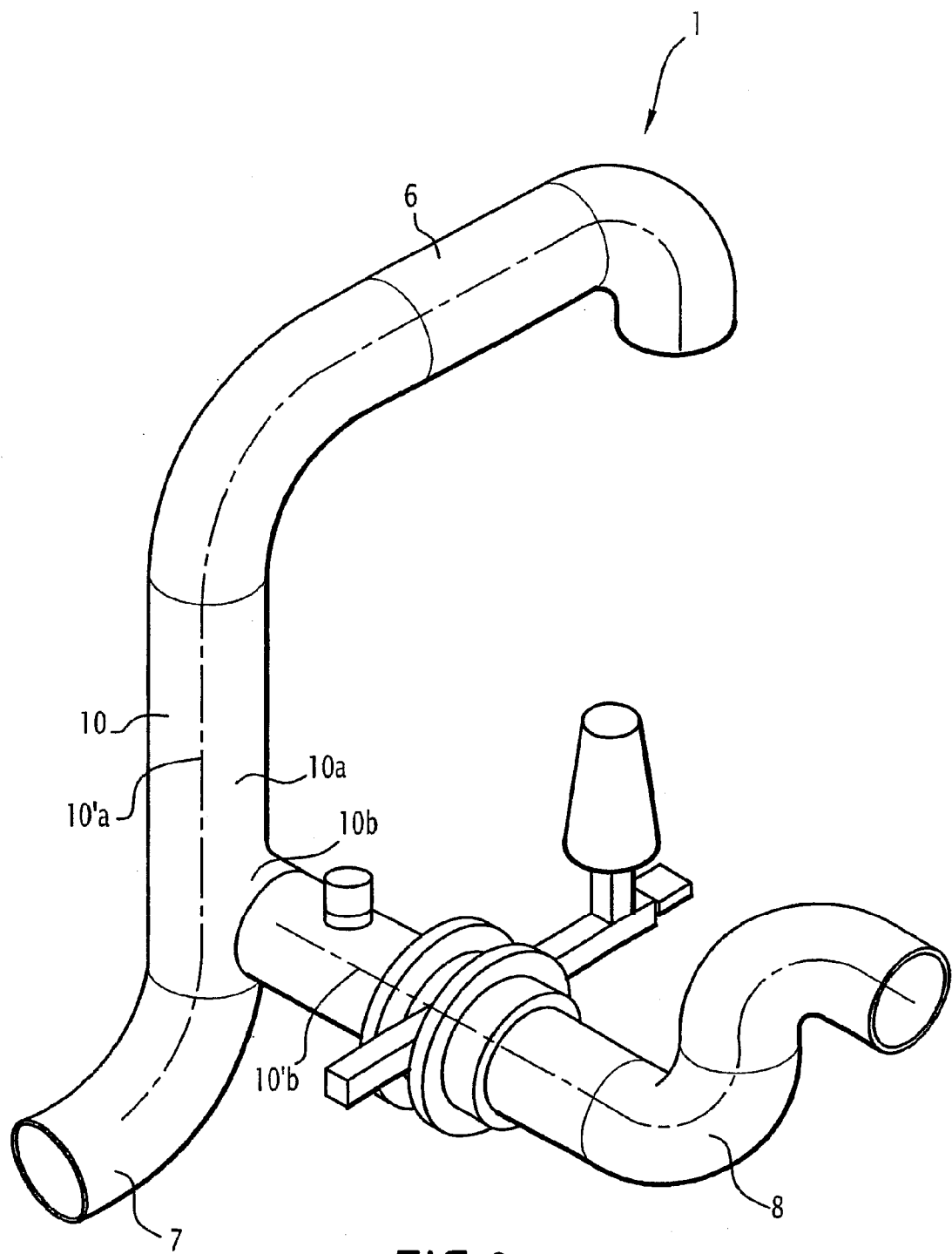
Figure 3:
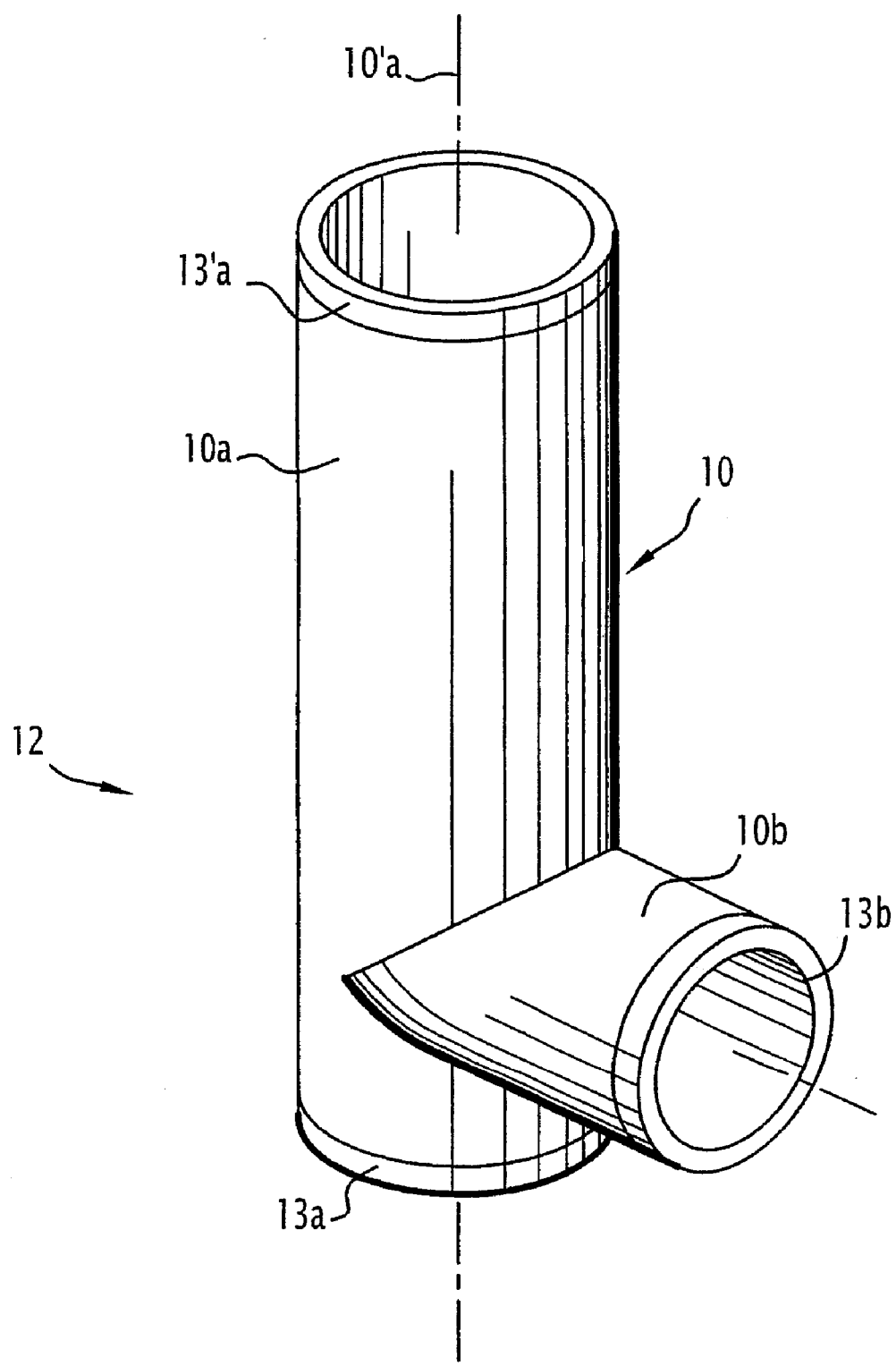

In order to make the invention clearly understood, the residual heat removal system of a pressurised water nuclear reactor and a T-shaped pipework element according to the invention used on the residual heat removal system will now be described by way of example with reference to the appended Figures, in which:

FIG. 1 is a schematic view of a residual heat removal system of a pressurised water nuclear reactor, FIG. 2 is a perspective view of a portion of the residual heat removal system comprising a tubular T-shaped connecting and mixing element, FIG. 3 is a perspective view of a connection piece comprising a T-shaped pipework element according to the invention which allows a T-shaped pipework element to be assembled or replaced on a new or used auxiliary circuit of a pressurised water nuclear reactor.

FIG. 1 schematically illustrates a residual heat removal system of a pressurised water nuclear reactor which is connected to the coolant system 14 of the nuclear reactor in which pressurised water flows which constitutes the primary cooling fluid of the nuclear reactor.

The coolant system 14 of the nuclear reactor comprises a plurality of loops on each of which there are arranged a primary pump for circulation of the coolant fluid and a vapour generator, which are connected to the nuclear reactor vessel in which the core which is constituted by fuel assemblies is arranged. The coolant system of a pressurised water nuclear reactor generally comprises three or four loops.

The residual heat removal system 1 illustrated in FIG. 1 is connected to two hot branches of the coolant system 14, that is to say, two branches which transfer coolant water which is heated in contact with the core to a vapour generator, via tapping ducts 2a, 2b on which stop valves are arranged which can be closed in order to isolate the residual heat removal system from the coolant system or opened in order to allow coolant water to be drawn off via the residual heat removal system which ensures the cooling thereof.

The coolant water drawn off from the coolant system via the inlet ducts 2a and 2b of the residual heat removal system is at a temperature of less than 180° C. and at a pressure of less than 45 bar, in the operational phases of the residual heat removal system.

The inlet ducts 2a and 2b are connected to a dual pumping circuit 3 which comprises two pumps which are arranged in parallel for the circulation of coolant water in the residual heat removal system. Downstream of the pumping stage 3, there is arranged a dual cooling circuit 4 which comprises a first heat exchanger 5a and a second heat exchanger 5b which are arranged in parallel for cooling the coolant water flowing in the residual heat removal system by a coolant fluid which is generally constituted by water. The residual heat removal system is connected, downstream of the cooling stage, via outlet ducts 6a, 6b, to two cold branches of the coolant system, that is to say, two branches which are connected to the vessel of the nuclear reactor and from which cooling water from the reactor cooled in a vapour generator is returned to the vessel of the nuclear reactor.

The residual heat removal system further comprises a diversion duct 7 which is connected to the upstream portion of the cooling stage 4 and which allows part of the cooling water of the reactor from the hot branches to reach, via the pumping stage 3, a discharge duct 8 which is connected to the downstream portion of the cooling stage 4 at one of the ends thereof and to the outlet ducts 6a and 6b of the residual heat removal system via a connection duct 6 at the second end thereof so that non-cooled coolant water from the pumping stage upstream of the cooling stage is mixed with cooled coolant water at the outlet of the cooling stage 4.

The passage and the adjustment of a flow of non-cooled water carried by the duct 7 to the discharge duct 8 are adjusted by means of adjustment and stop valves 7'.

A return duct 9 having a small diameter (approximately 50 mm in the case of a conventional residual heat removal system) is also connected, at a first end, to the connection duct 6 and, at the second end thereof, to a second connection duct 11 which passes non-cooled coolant water between the inlet ducts 2a and 2b and the pumping stage 3. The return duct 9 has a diameter which is substantially less than the diameter of the other pipes of the residual heat removal system (generally approximately 300 mm) and returns only a small flow of coolant water, mixed with cooled water reaching the connection duct 6, into the current of non-cooled coolant water flowing in the connection duct 11.

The diversion duct 7 is connected to the discharge duct 8 by means of a first T-shaped pipework element 10 which may be produced in accordance with the invention.

In the same manner, the return duct 9 is connected to the connection duct 11 by means of a second T-shaped pipework element 10' which may be produced in accordance with the invention.

FIG. 2 illustrates a portion of the residual heat removal system, in the region of the connection between the duct 8 for discharging cooled water and the ducts 7 and 6 for conveying coolant water in the direction of the outlet ducts 6a and 6b.

The T-shaped tubular element 10 comprises a main branch 10a whose axis is substantially vertical and a lateral branch 10b whose axis is substantially horizontal.

The end of the diversion duct 7 which is an elbow constitutes a first portion which is connected to an end or inlet end of the main branch 10a of the pipework element 10 and the duct 6 which is connected to the outlet ducts 6a and 6b constitutes a second elbow-like portion which is connected to the outlet end of the main branch 10a of the T-shaped pipework element 10.

The end of the duct 8 for discharging cooled water constitutes a third pipework portion which is connected to the lateral branch 10b of the pipework element 10. An adjustment valve allows the flow of cooled water towards the T-shaped connecting and mixing pipework element 10 to be controlled.

In this manner, the non-cooled water which is from the hot branches of the nuclear reactor and which reaches the T-shaped pipework element 10 via the diversion duct 7 is mixed with cooled water introduced into the pipework element 10 via the discharge duct 8 which is connected to the lateral branch 10b, the mixture being discharged via the connection duct 6 which is connected to the outlet end of the main branch 10a of the T-shaped element 10.

It may be advantageous to produce the pipework element 10 in an asymmetrical form, the lateral branch being, for example, connected to the main branch at some distance from the central portion thereof.

For example, if the channels 6 and 7 of the residual heat removal system and the main branch 10a of the T-shaped pipework element 10 have a diameter in the order of 300 mm, the length of the main branch 10a along the vertical axis 10'a thereof may be in the order of one metre and the distance in the direction of the axis 10'a of the main branch 10a between the axis 10'b of the lateral branch 10b and the inlet end of the main branch 10a may be in the order of 0.25 m, that is to say, approximately equal to a quarter of the length of the main branch 10a.

The pipework element 10 is constituted in the form of a simple T-shape pipe comprising the main branch 10a and the lateral branch 10b, both of which are tubular, and does not comprise an internal protection sleeve, so that the mixing of the fluids is carried out by direct contact of the fluids inside the main branch 10a which constitutes a mixing chamber.

According to the invention, the T-shaped pipework element 10 comprising the main branch 10a and the lateral branch 10b which are fixedly joined to each other is produced from martensitic stainless steel.

Preferably, the T-shaped pipework element 10 is produced from martensitic stainless steel of the type 13-4 whose standardised reference is Z5CND13-4, this steel comprising in the order of from 0.050% of carbon, 13% of chromium and 4% of nickel.

According to the European standard NF EN10222-5 and in accordance with the technical specification M3204 (code RCC-M, edition 2000), the chemical composition of a 13-4 steel of this type is defined by the following ranges relating to each of the elements (in percentages by weight):
carbon: 0.060% maximum
chromium: 12.00%-14.00%
nickel: 3.50% to 4.50%
molybdenum: 0.30%-0.70%
manganese: 0.50%-1.00%
silicon: 0.30%-0.60%
sulphur: 0.020% maximum
phosphorus: 0.030% maximum,
the remainder of the composition, with the exception of the inevitable impurities, being constituted by iron.

The mechanical properties which must be obtained relating to this martensitic stainless steel, according to the technical specification set out above, are as follows:
Rp0.2 (elastic limit at 0.2%) minimum value: 685 MPa at 20° C.
Rm (mechanical strength): 780 to 980 MPa at 20° C.
A % (elongation at break) minimum value: 15% at 20° C.
Resilience (minimum mean value) 56 Joules at 0° C.
Resilience (minimum individual value) 40 Joules at 0° C.

In order to obtain improved properties of resistance in terms of thermal fatigue, in the case of the pipework elements according to the invention, it is preferable to reduce the maximum content in terms of sulphur to a level which is well below 0.020%. A maximum limit of 0.005% is therefore considered to be preferable.

In order to prevent the material from becoming susceptible to the phenomenon of reversible temper embrittlement, owing to the segregation of phosphorus, it is preferable to reduce the maximum content in terms of phosphorus to a level which is well below 0.030%. A maximum limit of 0.005% is therefore considered to be preferable.

Generally, when a T-shaped pipework element is produced for an auxiliary circuit of a pressurised water nuclear reactor, it is necessary to provide a martensitic steel which has good weldability or quenchability characteristics.

A steel of this type whose base composition is that of 13-4 martensitic stainless steel has the following preferred composition:
carbon: 0.050% maximum
chromium: 12.50%-14.00%
nickel: 3.50%-4.50%
molybdenum: 0.50%-0.70%
manganese: 0.50%-1.00%
silicon: 0.30%-0.60%
sulphur: 0.005% maximum
phosphorus: 0.005% maximum,
the remainder of the composition, with the exception of the inevitable impurities, being constituted by iron.

It can be seen that, in a composition of this type, in order to improve the weldability, the contents in terms of the elements carbon, chromium and molybdenum are specified.

The T-shaped pipework element according to the invention is produced by means of forging or stamping with a global forging coefficient (elongation during forging) greater than 3.

The T-shaped tubular element can be produced in one piece or from two tubular elements, that is to say, the main branch and the lateral branch which are then welded to each other along the edge of an opening made in the wall of the main branch.

The pipework element obtained by means of forging is subjected to a thermal processing operation comprising oil quenching from a temperature of from 950° C. to 1080° C. followed by tempering at a temperature greater than 580° C., according to the technical specification RCCM STRM 3204 set out above.

The T-shaped pipework element according to the invention is intended to be connected, by means of butt-welding, to austenitic stainless steel pipes of an auxiliary circuit of a pressurised water nuclear reactor, such as a residual heat removal system.

This operation must be carried out on the site of the nuclear reactor, both when a new nuclear reactor is constructed and when a T-shaped pipework element is replaced in a used auxiliary circuit of a nuclear reactor which has already been operated. Owing to the fact that the T-shaped tubular element is of martensitic stainless steel, the connection and the welding thereof to the auxiliary circuit requires the production of heterogeneous weld seams (also referred to as bi-metal connections).

The bi-metal connections between the martensitic stainless steel pipework element and the austenitic stainless steel pipes of an auxiliary circuit (or, preferably, between the T-shaped element and the intermediate connection pieces of austenitic stainless steel) may be produced in accordance with various techniques which will be mentioned below.

According to a first technique, it is possible to produce bi-metal connections of stainless steel by carrying out a thick deposit (or buttering) of austenitic stainless steel on the free ends of the branches of the T-shaped pipework element, followed by filling a chamfer gap delimited between the buttering layer of austenitic stainless steel and the end of the tubular component of austenitic stainless steel with a filler metal of stainless steel which has a composition which is compatible with that of the buttering layer and the tubular component of austenitic stainless steel. The buttering and the welding may be carried out with a filler metal, such as a 316L, 309L or 308L austenitic stainless steel. After the buttering, a stress-relief heat treatment of the end of the T-shaped tubular element must be carried out.

It is also possible to produce a bi-metal connection of nickel alloy, such as the alloy 52, by depositing the filler metal constituted by the alloy 52 in a narrow chamfer gap between the end of the martensitic stainless steel T-shaped pipework element and the tubular component of austenitic stainless steel, with no prior buttering of the end of the T-shaped tubular element.

It is also possible to produce a bi-metal connection with a filler metal of martensitic stainless steel which is deposited in a chamfer gap between the end of the T-shaped pipework element of martensitic stainless steel and a tubular element of austenitic stainless steel.

Although it is possible to produce, using one of the welding techniques indicated above, a direct connection of the ends of the T-shaped pipework element with provided ends of two austenitic stainless steel pipes of the auxiliary circuit, it is preferable to produce in a factory, prior to on-site assembly, from the T-shaped tubular element, a connection piece 12 as illustrated in FIG. 3.

A connection piece of this type which comprises the pipework element 10 itself is constituted by the main branch 10a and the lateral branch 10b which are fixedly joined to each other and austenitic stainless steel tubular connection elements 13a and 13'a, respectively, at the first and the second end of the main branch 10a and 13b at the free connection end of the lateral branch 10b.

The tubular connection elements 13a, 13'a and 13b are preferably obtained by means of cutting portions from non-welded tubes of an austenitic stainless steel, such as 304L steel. The tubular connection portions are then butt-welded to the ends of the T-shaped pipework element 10 which was obtained beforehand by means of forging followed by a thermal processing operation. The welding of the austenitic stainless steel tubular connection elements to the ends of the T-shaped pipework element of martensitic stainless steel may be carried out using one of the three techniques described above. This operation is carried out in a factory. After levelling and internal polishing, then verification of the weld seams, the component can be used on the site of the nuclear reactor in order to carry out the assembly or replacement of a T-shaped pipework element of an auxiliary circuit of a pressurised water nuclear reactor.

The weld seams to be produced in situ are homogeneous weld seams between the tubular connection elements and the provided ends of the austenitic stainless steel channels of the auxiliary circuit.

The T-shaped martensitic stainless steel pipework elements for connecting and mixing according to the invention allow the fluids to be mixed. Furthermore, the use of a martensitic steel to produce the T-shaped pipework element for connecting and mixing allows the resistance thereof to thermal fatigue to be significantly improved compared with the T-shaped austenitic stainless steel pipework elements according to the prior art. In particular, it is possible to carry out, inside T-shaped pipework elements, the mixing of fluids at temperatures whose difference is far greater than 50° C. (for example, 160° C.), whilst maintaining an adequate service life of the T-shaped connection member for normal use of the residual heat recovery system.

By using a largely asymmetrical T-shape, the lateral branch being connected to the main branch in a zone remote from the central portion of the main branch (in the axial direction) and close to the inlet end of the main branch, so that the main branch covers the fluctuation zones, the mixing zone is moved away from the downstream connection weld seam of the pipework element. The downstream connection weld seam of the pipework element is thus moved away from the zone in which temperature oscillations are brought about owing to the introduction of a second fluid at a lower temperature into the flow of the first fluid.

The invention is not limited to the embodiment which has been described.

Although 13-4 martensitic stainless steel having the adjusted composition mentioned above allows both good weldability conditions for the pipework element and a very good resistance to thermal fatigue to be achieved, it is possible to envisage the use of martensitic stainless steels having other compositions, for example, martensitic stainless steels in accordance with the standardised references Z12C13, Z12CN13, Z5CND16.04 or Z6CNU17.04.

The intake of the first and second fluids in the T-shaped pipework element and the discharge of the mixed fluid can be carried out via any one of the ends of the main branch or via the lateral branch of the T-shaped pipework element.

The lateral branch may form an angle which is not equal to 90° with the main branch.

The invention may be used in the assembly or replacement of high-flow-rate or low-flow-rate T-shaped mixing members of residual heat removal systems of all pressurised water reactors.

The martensitic steel T-shaped pipework elements according to the invention may also be used as T-shaped connecting and mixing members on various austenitic stainless steel auxiliary circuits of nuclear reactors which are cooled by pressurised water, in addition to residual heat removal systems.

The invention claimed is:

1. A T-shaped pipe work element for an auxiliary circuit of a nuclear reactor cooled by pressurized water, connected to a coolant system of the nuclear reactor in which cooling water of the reactor flows, the pipe work element comprising:
   a main tubular branch which has a first attachment end, for the connection thereof to a first pipe work portion of the auxiliary circuit, and a second attachment end, for the connection thereof to a second pipe work portion of the auxiliary circuit;
   a lateral branch which has an axis in an angular arrangement relative to the axis of the main branch and a free end for connection to a third pipe work portion of the auxiliary circuit;
   whereby the first, the second and the third pipe work portions of the auxiliary circuit, when the auxiliary circuit is operational, each carry out a function different from the other two portions;
   wherein the different functions include: supplying a first fluid at high temperature in the T-shaped pipe work element, providing a second fluid at a temperature which is lower than the temperature of the first fluid for the pipe work element, and discharging a mixture of the first and second fluids produced in the T-shaped pipe work element, the discharging function being carried out by the second pipe work portion;
   wherein the T-shaped pipe work element is produced from martensitic stainless steel;
   wherein the T-shaped pipe work element is produced in an asymmetrical T-shape, the lateral branch being connected to the main branch in a zone of the main branch which is not equidistant from the first and the second attachment ends of the main branch such that the length of a leg of the main tubular branch between the connection of the lateral branch and the second attachment end:
   is longer than the length of a leg between the connection of the lateral branch and the first attachment end, and is longer than the length of the lateral branch;
   further comprising austenitic stainless steel tubular connection elements which are connected end-to end to the first and second attachment ends of the main branch and to the free end of the lateral branch, respectively, of the martensitic stainless steel T-shaped tubular element;
   wherein said austenitic stainless steel tubular connection elements are each butt-welded to a respective attachment end of the main branch or alternatively to the lateral branch of the T-shaped tubular element.

2. The pipe work element according to claim 1, wherein the martensitic stainless steel contains (in percentages by weight) up to 0.060% of carbon, from 12% to 14% of chromium, from 3.50% to 4.50% of nickel, from 0.30% to 0.70% of molybdenum, from 0.50% to 1% of manganese, from 0.30% to 0.60% of silicon, less than 0.020% of sulphur, less than 0.030% of phosphorus, the remainder of the composition, with the exception of any impurities, being constituted by iron.

3. The pipe work element according to claim 2, wherein the martensitic stainless steel contains (in percentages by weight) up to 0.050% of carbon, from 12.50% to 14% of chromium, from 3.50% to 4.50% of nickel, from 0.50% to 0.70% of molybdenum, from 0.50% to 1.00% of manganese, from 0.30% to 0.60% of silicon, less than 0.005% of sulphur and less than 0.005% of phosphorus, the remainder of the alloy, with the exception of the inevitable impurities, being constituted by iron.

4. The pipe work element according to claim 2, wherein the T-shaped pipe work element is produced by means of forging with a global forging coefficient greater than 3 followed by a thermal processing operation comprising oil quenching from a temperature of from 950° C. to 1080° C. and a tempering operation at a temperature greater than 580° C.

* * * * *